(12) United States Patent
Whitney et al.

(10) Patent No.: US 7,599,780 B2
(45) Date of Patent: Oct. 6, 2009

(54) METHODS AND SYSTEMS TO FEEDBACK COORDINATED TORQUE CONTROL SYSTEM INFORMATION

(75) Inventors: Christopher E. Whitney, Highland, MI (US); Robert C. Simon, Jr., Brighton, MI (US); Leonard G. Wozniak, Ann Arbor, MI (US); Richard B. Jess, Haslett, MI (US); Meera Raja, West Bloomfield, MI (US)

(73) Assignee: GM Global Technology Operations, Inc.

( * ) Notice: Subject to any disclaimer, the term of this patent is extended or adjusted under 35 U.S.C. 154(b) by 0 days.

(21) Appl. No.: 12/146,661

(22) Filed: Jun. 26, 2008

(65) Prior Publication Data
US 2009/0005216 A1    Jan. 1, 2009

Related U.S. Application Data

(60) Provisional application No. 60/958,003, filed on Jun. 29, 2007.

(51) Int. Cl.
*G06F 19/00* (2006.01)
*B60W 10/04* (2006.01)

(52) U.S. Cl. ...................... 701/102; 701/110

(58) Field of Classification Search .............. 701/102, 701/101, 110, 114, 115, 54; 477/107
See application file for complete search history.

(56) References Cited

U.S. PATENT DOCUMENTS

| | | | | |
|---|---|---|---|---|
| 5,459,662 | A * | 10/1995 | Tezuka et al. ............. | 701/86 |
| 6,553,958 | B1 * | 4/2003 | Kolmanovsky et al. ..... | 123/295 |
| 6,782,868 | B1 * | 8/2004 | Doering ................ | 123/333 |
| 7,305,300 | B2 * | 12/2007 | Gibson et al. ............ | 701/110 |

* cited by examiner

*Primary Examiner*—Hieu T Vo
(74) *Attorney, Agent, or Firm*—Harness, Dickey & Pierce, P.L.C.

(57) ABSTRACT

An engine control system comprises a first torque request module that generates a first torque request, a second torque request module that generates a second torque request, a torque arbitration module, an arbitration feedback module, and a torque control module. The torque arbitration module selects one of the first and second torque requests and outputs an arbitrated torque based on the selected one of the first and second torque requests. The arbitration feedback module reports a status signal to the first torque request module. The status signal has a first value when the first torque request is the selected one of the first and second torque requests. The torque control module controls an engine to produce the arbitrated torque. The power source includes an internal combustion engine.

20 Claims, 6 Drawing Sheets

| Requesting Type | Arbitration Result | Limitation Result | Allow Integration Up | Allow Integration Down |
|---|---|---|---|---|
| Decreasing | Won | No Limitation | X | X |
| Decreasing | Won | Reached Max Limit | N/A | N/A |
| Decreasing | Won | Reached Min Limit | X | |
| Decreasing | Lost To Decreaser | No Limitation | | X |
| Decreasing | Lost To Decreaser | Reached Max Limit | N/A | N/A |
| Decreasing | Lost To Decreaser | Reached Min Limit | | |
| Increasing | Won | No Limitation | X | X |
| Increasing | Won | Reached Max Limit | | X |
| Increasing | Won | Reached Min Limit | N/A | N/A |
| Increasing | Lost to Increaser | No Limitation | X | |
| Increasing | Lost to Increaser | Reached Max Limit | | X |
| Increasing | Lost to Increaser | Reached Min Limit | N/A | N/A |
| Increasing | Lost To Decreaser | No Limitation | | X |
| Increasing | Lost To Decreaser | Reached Max Limit | N/A | N/A |
| Increasing | Lost To Decreaser | Reached Min Limit | N/A | N/A |
| Bidirectional | Won | No Limitation | X | X |
| Bidirectional | Won | Reached Max Limit | | X |
| Bidirectional | Won | Reached Min Limit | X | |
| Bidirectional | Lost to Increaser | No Limitation | X | |
| Bidirectional | Lost to Increaser | Reached Max Limit | X | |
| Bidirectional | Lost to Increaser | Reached Min Limit | X | |
| Bidirectional | Lost To Decreaser | No Limitation | | X |
| Bidirectional | Lost To Decreaser | Reached Max Limit | | X |
| Bidirectional | Lost To Decreaser | Reached Min Limit | | X |

FIG. 6

METHODS AND SYSTEMS TO FEEDBACK COORDINATED TORQUE CONTROL SYSTEM INFORMATION

CROSS-REFERENCE TO RELATED APPLICATIONS

This application claims the benefit of U.S. Provisional Application No. 60/958,003, filed on Jun. 29, 2007. The disclosure of the above application is incorporated herein by reference in its entirety.

FIELD

The present invention relates to methods and systems for engine torque control.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Airflow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the air and fuel to the cylinders increases the torque output of the engine.

Engine control systems have been developed to control engine torque output to achieve a desired torque. Traditional engine control systems, however, do not control the engine torque output as accurately as desired. Further, traditional engine control systems do not provide as rapid of a response to control signals as is desired or coordinate engine torque control among various devices that affect engine torque output.

SUMMARY

An engine control system comprises a first torque request module that generates a first torque request, a second torque request module that generates a second torque request, a torque arbitration module, an arbitration feedback module, and a torque control module. The torque arbitration module selects one of the first and second torque requests and outputs an arbitrated torque based on the selected one of the first and second torque requests. The arbitration feedback module reports a status signal to the first torque request module. The status signal has a first value when the first torque request is the selected one of the first and second torque requests. The torque control module controls a power source to produce the arbitrated torque. The power source includes an internal combustion engine. The arbitration feedback module also reports a second status signal to the second torque request module. The second status signal has the first value when the second torque request is the selected one of the first and second torque requests.

A method comprises generating a first torque request; generating a second torque request; selecting one of the first and second torque requests; generating an arbitrated torque based on the selected one of the first and second torque requests; reporting a status signal, where the status signal has a first value when the first torque request is the selected one of the first and second torque requests; and controlling a power source to produce the arbitrated torque. The method further comprises reporting a second status signal. The second status signal has the first value when the second torque request is the selected one of the first and second torque requests. The power source includes an internal combustion engine.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 6 is a table of exemplary integrator control according to the principles of the present disclosure.

DETAILED DESCRIPTION

Figure 1:
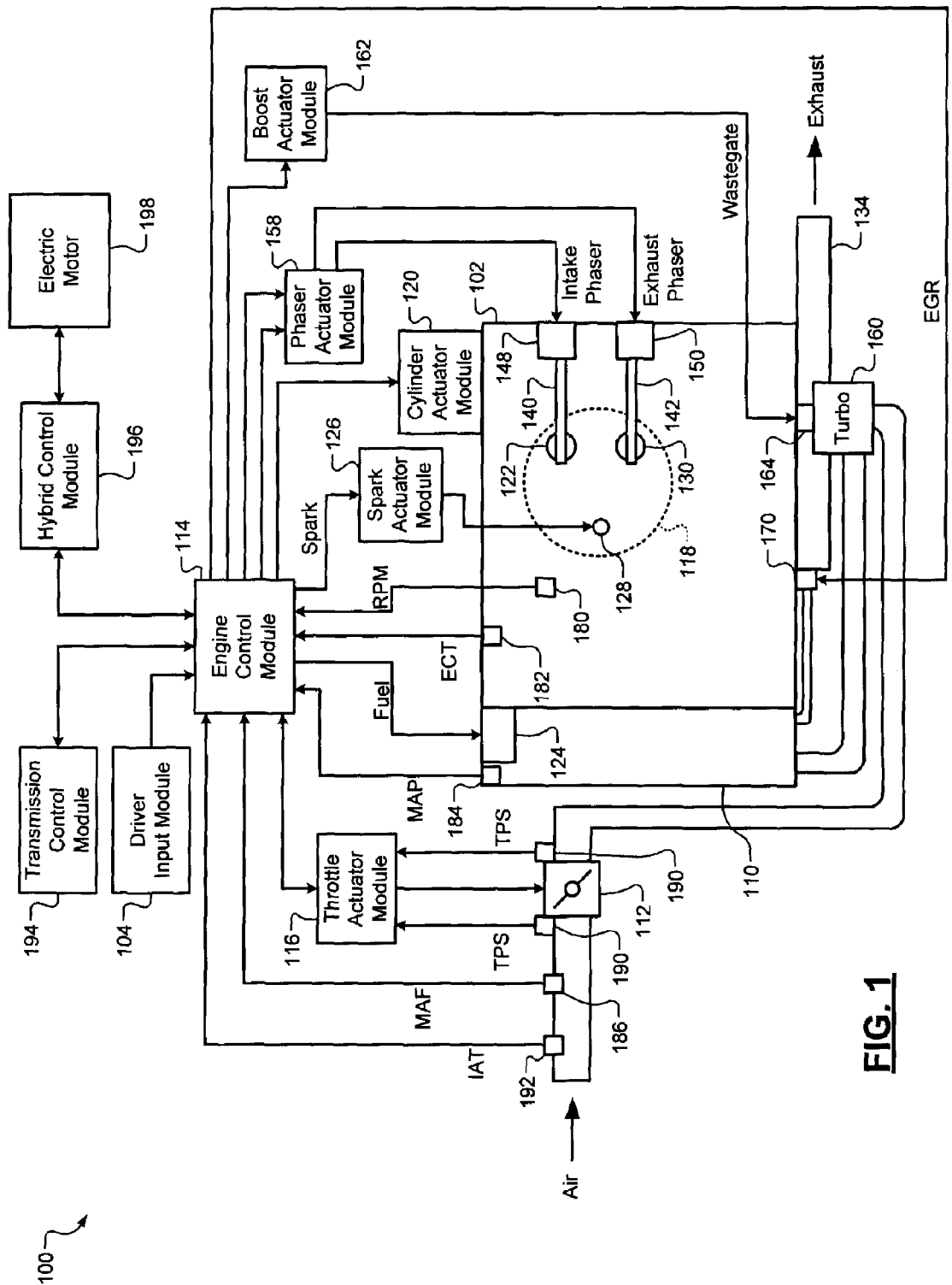
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a functional block diagram of an engine system 100 is presented. The teachings of the present disclosure apply to torque producers of any type, including but not limited to spark ignition gasoline engines, compression ignition diesel engines, fuel cell engines, propane engines, electric motors, etc. For purposes of illustration only, the following figures depict a spark ignition gasoline-powered internal combustion engine.

The engine system 100 includes an engine 102 that combusts an air/fuel mixture to produce drive torque for a vehicle based on a driver input module 104. Air is drawn into an intake manifold 110 through a throttle valve 112. An engine control module (ECM) 114 commands a throttle actuator module 116 to regulate opening of the throttle valve 112 to control the amount of air drawn into the intake manifold 110.

Air from the intake manifold 110 is drawn into cylinders of the engine 102. While the engine 102 may include multiple cylinders, for illustration purposes, a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders to improve fuel economy.

Air from the intake manifold 110 is drawn into the cylinder 118 through an intake valve 122. The ECM 114 controls the amount of fuel injected by a fuel injection system 124. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders.

The injected fuel mixes with the air and creates the air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as to top dead center (TDC), the point at which the air/fuel mixture is most compressed.

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate cylinders by halting provision of fuel and spark and/or disabling their exhaust and/or intake valves.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114.

The engine system 100 may include a boost device that provides pressurized air to the intake manifold 110. For example, FIG. 1 depicts a turbocharger 160. The turbocharger 160 is powered by exhaust gases flowing through the exhaust system 134, and provides a compressed air charge to the intake manifold 110. The turbocharger 160 may compress air before the air reaches the intake manifold 110.

A wastegate 164 may allow exhaust gas to bypass the turbocharger 160, thereby reducing the turbocharger's output (or boost). The ECM 114 controls the turbocharger 160 via a boost actuator module 162. The boost actuator module 162 may modulate the boost of the turbocharger 160 by controlling the position of the wastegate 164. The compressed air charge is provided to the intake manifold 110 by the turbocharger 160. An intercooler (not shown) may dissipate some of the compressed air charge's heat, which is generated when air is compressed and may also be increased by proximity to the exhaust system 134. Alternate engine systems may include a supercharger that provides compressed air to the intake manifold 110 and is driven by the crankshaft.

The engine system 100 may include an exhaust gas recirculation (EGR) valve 170, which selectively redirects exhaust gas back to the intake manifold 110. In various implementations, the EGR valve 170 may be located after the turbocharger 160. The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186. In various implementations, the MAF sensor 186 may be located in a housing with the throttle valve 112.

The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the ECM 114 may reduce torque during a gear shift. The ECM 114 may communicate with a hybrid control module 196 to coordinate operation of the engine 102 and an electric motor 198. The electric motor 198 may also function as a generator, and may be used to produce electrical energy for use by vehicle electrical systems and/or for storage in a battery. In various implementations, the ECM 114, the transmission control module 194, and the hybrid control module 196 may be integrated into one or more modules.

To abstractly refer to the various control mechanisms of the engine 102, each system that varies an engine parameter may be referred to as an actuator. For example, the throttle actuator module 116 can change the blade position, and therefore the opening area, of the throttle valve 112. The throttle actuator module 116 can therefore be referred to as an actuator, and the throttle opening area can be referred to as an actuator position.

Similarly, the spark actuator module 126 can be referred to as an actuator, while the corresponding actuator position is amount of spark advance. Other actuators include the boost actuator module 162, the EGR valve 170, the phaser actuator module 158, the fuel injection system 124, and the cylinder actuator module 120. The term actuator position with respect to these actuators may correspond to boost pressure, EGR valve opening, intake and exhaust cam phaser angles, air/fuel ratio, and number of cylinders activated, respectively.

Figure 2:
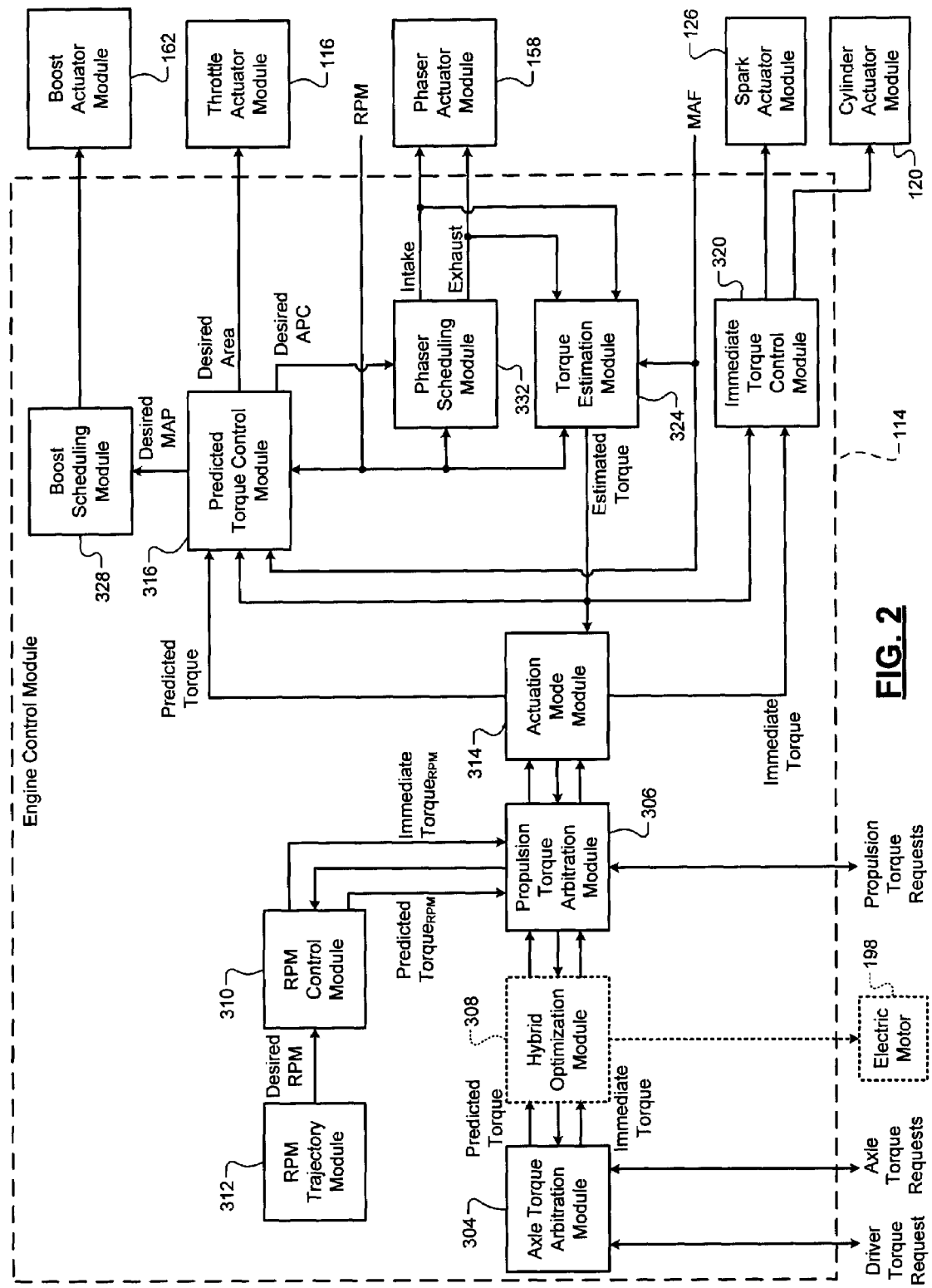
FIG. 2 is a functional block diagram of an exemplary engine control system according to the principles of the present disclosure.

Referring now to FIG. 2, a functional block diagram of an exemplary engine control system is presented. An exemplary implementation of the ECM 114 includes an axle torque arbitration module 304. The axle torque arbitration module 304 arbitrates between driver inputs from the driver input module 104 and other axle torque requests. For example, driver inputs may include accelerator pedal position. Other axle torque requests may include torque reduction requested during a gear shift by the transmission control module 194, torque reduction requested during wheel slip by a traction control system, and torque requests to control speed from a cruise control system.

Axle torque requests may also include requests from an adaptive cruise control module, which may vary a torque request to maintain a predetermined following distance. Axle torque requests may also include torque increases due to negative wheel slip, such as where a tire of the vehicle slips with respect to the road surface when the torque produced by the powertrain is negative.

Axle torque requests may also include brake torque management requests and torque requests intended to prevent vehicle over-speed conditions. Brake torque management requests may reduce engine torque to ensure that engine torque does not exceed the ability of the brakes to hold the vehicle when the vehicle is stopped. Axle torque requests may also be made by vehicle stability control systems. Axle torque requests may further include torque cutoff requests, such as may be generated when a critical fault is detected.

The axle torque arbitration module 304 outputs predicted and immediate torque requests. The predicted torque request is the amount of torque that will be required in the future to meet the driver's torque and/or speed requests. The immediate torque request is the torque required at the present moment to meet temporary torque requests, such as torque reductions when shifting gears or when traction control senses wheel slippage.

The immediate torque request may be achieved by engine actuators that respond quickly, while slower engine actuators are targeted to achieve the predicted torque request. For example, a spark actuator may be able to quickly change spark advance, while cam phaser or throttle actuators may be slower to respond. The axle torque arbitration module 304 outputs the predicted and immediate torque requests to a propulsion torque arbitration module 306.

In various implementations, the axle torque arbitration module 304 may output the predicted and immediate torque requests to a hybrid optimization module 308. The hybrid optimization module 308 determines how much torque should be produced by the engine and how much torque should be produced by the electric motor 198. The hybrid optimization module 308 then outputs modified predicted and immediate torque request values to the propulsion torque arbitration module 306. In various implementations, the hybrid optimization module 308 may be implemented in the hybrid control module 196.

The propulsion torque arbitration module 306 arbitrates between the predicted and immediate torque requests and other propulsion torque requests. Propulsion torque requests may include torque reductions for engine over-speed protection and torque increases for stall prevention. Propulsion torque requests may also include torque requests from a speed control module, which may control engine speed during idle and coastdown, such as when the driver removes their foot from the accelerator pedal.

Propulsion torque requests may also include a clutch fuel cutoff, which may reduce engine torque when the driver depresses the clutch pedal in a manual transmission vehicle. Various torque reserves may also be provided to the propulsion torque arbitration module 306 to allow for fast realization of those torque values should they be needed. For example, a reserve may be applied for air conditioning compressor turn-on and for power steering pump torque demands.

A catalyst light-off or cold start emissions process may vary spark advance for an engine. A corresponding propulsion torque request may be made to balance out the change in spark advance. In addition, the air-fuel ratio of the engine and/or the mass air flow of the engine may be varied, such as by diagnostic intrusive equivalence ratio testing and/or new engine purging. Corresponding propulsion torque requests may be made to offset these changes.

Propulsion torque requests may also include a shutoff request, which may be initiated by detection of a critical fault. For example, critical faults may include vehicle theft detection, stuck starter motor detection, electronic throttle control problems, and unexpected torque increases. In various implementations, various requests, such as shutoff requests, may not be arbitrated. For example, they may always win arbitration or may override arbitration altogether. The propulsion torque arbitration module 306 may still receive these requests so that, for example, appropriate data can be fed back to other torque requesters.

The propulsion torque arbitration module 306 arbitrates between torque requests from the axle torque arbitration module 304 or the hybrid optimization module 308, an RPM control module 310, and other propulsion torque requests. Other propulsion torque requests may include, for example, torque reductions for engine over-speed protection and torque increases for stall prevention.

The RPM control module 310 outputs a predicted and immediate torque request to the propulsion torque arbitration module 306. The propulsion torque arbitration module 306 may simply select the torque requests from the RPM control module 310 when the ECM 114 is in RPM mode. RPM mode may be enabled when the driver takes their foot off the pedal. RPM mode may then be used for vehicle coastdown as well as when the vehicle is idling. RPM mode may be selected when the predicted torque requested by the axle torque arbitration module 304 is less than a calibrated torque value.

The RPM control module 310 receives a desired RPM from an RPM trajectory module 312. The RPM trajectory module 312 determines a desired RPM for RPM mode. For example only, the RPM trajectory module 312 may output a linearly decreasing RPM until the RPM reaches an idle RPM. The RPM trajectory module 312 may then continue outputting the idle RPM.

In various implementations, the RPM trajectory module 312 may function as described in commonly assigned U.S. Pat. No. 6,405,587, issued on Jun. 18, 2002 and entitled "System and Method of Controlling the Coastdown of a Vehicle," the disclosure of which is expressly incorporated herein by reference in its entirety.

An actuation mode module 314 receives the predicted torque and the immediate torque requests from the propulsion torque arbitration module 306. Based upon a mode setting, the actuation mode module 314 determines how the predicted and immediate torques will be achieved. For example, changing the throttle valve 112 allows for a wide range of torque control. However, opening and closing the throttle valve 112 is relatively slow.

Disabling cylinders provides for a wide range of torque control, but may produce drivability and emissions concerns. Changing spark advance is relatively fast, but does not provide much range of control. In addition, the amount of control possible with spark (spark capacity) changes as the amount of air entering the cylinder 118 changes.

According to the present disclosure, the throttle valve 112 may be closed just enough so that the desired immediate torque can be achieved by retarding the spark as far as possible. This provides for rapid resumption of the previous torque, as the spark can be quickly returned to its calibrated timing, which generates maximum torque. In this way, the use of relatively slowly-responding throttle valve corrections is minimized by maximizing the use of quickly-responding spark retard.

The approach the actuation mode module 314 takes in meeting the immediate torque request is determined by a mode setting. The mode setting provided to the actuation mode module 314 may include an inactive mode, a pleasible mode, a maximum range mode, and an auto actuation mode.

In the inactive mode, the actuation mode module 314 may ignore the immediate torque request. For example, the actuation mode module 314 may output the predicted torque to a predicted torque control module 316. The predicted torque control module 316 converts the predicted torque to desired actuator positions for slow actuators. For example, the predicted torque control module 316 may control desired manifold absolute pressure (MAP), desired throttle area, and/or desired air per cylinder (APC).

An immediate torque control module 320 determines desired actuator positions for fast actuators, such as desired spark advance. The actuation mode module 314 may instruct the immediate torque control module 320 to set the spark advance to a calibrated value, which achieves the maximum possible torque for a given airflow. In the inactive mode, the immediate torque request does not therefore reduce the amount of torque produced or impact spark advance from calibrated values.

In the pleasible mode, the actuation mode module 314 may attempt to achieve the immediate torque request using only spark retard. This may mean that if the desired torque reduction is greater than the spark reserve capacity (amount of torque reduction achievable by spark retard), the torque reduction will not be achieved. The actuation mode module 314 may therefore output the predicted torque to the predicted torque control module 316 for conversion to a desired throttle area. The actuation mode module 314 may output the immediate torque request to the immediate torque control module 320, which will retard the spark as much as possible to attempt to achieve the immediate torque.

In the maximum range mode, the actuation mode module 314 may instruct the cylinder actuator module 120 to turn off one or more cylinders to achieve the immediate torque request. The actuation mode module 314 may use spark retard for the remainder of the torque reduction by outputting the immediate torque request to the immediate torque control module 320. If there is not enough spark reserve capacity, the actuation mode module 314 may reduce the predicted torque request going to the predicted torque control module 316.

In the auto actuation mode, the actuation mode module 314 may decrease the predicted torque request output to the predicted torque control module 316. The predicted torque may be reduced only so far as is necessary to allow the immediate torque control module 320 to achieve the immediate torque request using spark retard.

The actuation mode module 314 may receive feedback from the torque estimation module 324 regarding powertrain capacities and capabilities. The actuation mode module 314 may also receive feedback regarding the state of various actuators. This feedback data may be passed back to the propulsion torque arbitration module 306 and the axle torque arbitration module 304. Each torque requester may receive this feedback as well as feedback regarding arbitration results from the axle torque arbitration module 304 and the propulsion torque arbitration module 306.

The immediate torque control module 320 receives an estimated torque from a torque estimation module 324 and sets spark advance using the spark actuator module 126 to achieve the desired immediate torque. The estimated torque may represent the amount of torque that could immediately be produced by setting the spark advance to a value calibrated to produce the greatest torque. The immediate torque control module 320 can therefore select a spark advance that reduces the estimated torque to the immediate torque.

The predicted torque control module 316 also receives the estimated torque and may receive a measured mass air flow (MAF) signal and an engine revolutions per minute (RPM) signal. The predicted torque control module 316 generates a desired manifold absolute pressure (MAP) signal, which is output to a boost scheduling module 328.

The boost scheduling module 328 uses the desired MAP signal to control the boost actuator module 162. The boost actuator module 162 then controls a turbocharger and/or a supercharger. The predicted torque control module 316 generates a desired area signal, which is output to the throttle actuator module 116. The throttle actuator module 116 then regulates the throttle valve 112 to produce the desired throttle area.

The predicted torque control module 316 generates a desired air per cylinder (APC) signal, which is output to a phaser scheduling module 332. Based on the desired APC signal and the RPM signal, the phaser scheduling module 332 commands the intake and/or exhaust cam phasers 148 and 150 to calibrated values using the phaser actuator module 158.

The torque estimation module 324 uses the commanded intake and exhaust cam phaser positions along with the MAF signal to determine the estimated torque. Alternatively, the torque estimation module 324 may use actual or measured phaser positions. Further discussion of torque estimation can be found in commonly assigned U.S. Pat. No. 6,704,638 entitled "Torque Estimator for Engine RPM and Torque Control," the disclosure of which is incorporated herein by reference in its entirety.

Figure 3:
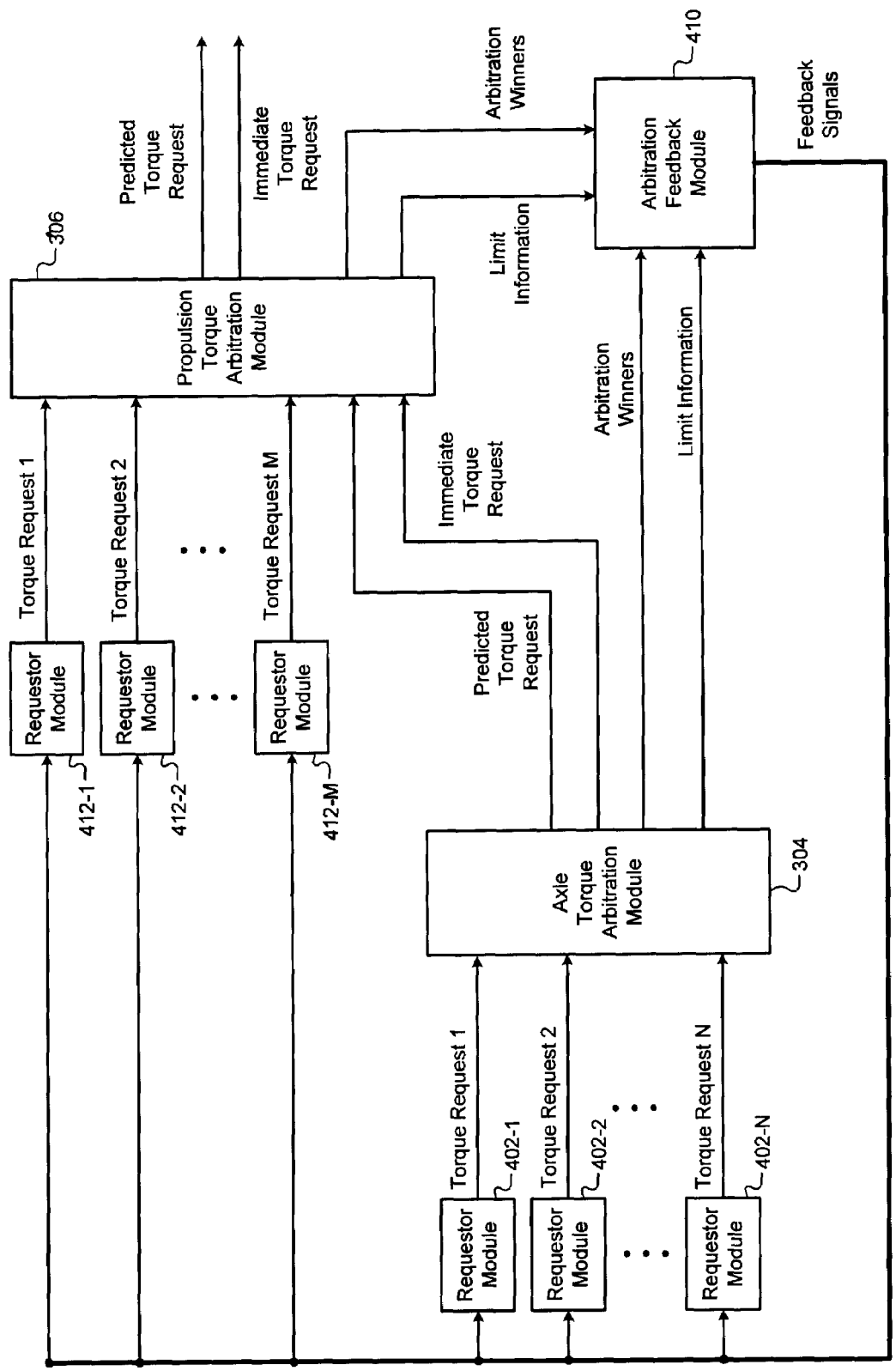
FIG. 3, a functional block diagram depicts an exemplary torque arbitration system according to the principles of the present disclosure.

Referring now to FIG. 3, a functional block diagram depicts an exemplary torque arbitration system. In various implementations, some or all of the modules shown in FIG. 3 may be implemented in the engine control module 114 of FIG. 2. The axle torque arbitration module 304 receives N torque requests from requestor modules 402-1, 402-2, ... and 402-N. These torque requests each request a specified axle torque to be produced. For example only, these torque requests may include cruise control, vehicle overspeed protection, and driver input, such as an accelerator pedal.

The torque requests may be requests for immediate torque and/or predicted torque. The axle torque arbitration module 304 arbitrates between these requests and produces a predicted torque request and an immediate torque request. These torque requests are converted from the axle torque domain into the propulsion torque domain and transmitted to a propulsion torque arbitration module 306. Information about which torque requests prevailed in axle torque arbitration is sent to an arbitration feedback module 410.

The axle torque arbitration module 304 may apply limits to incoming torque requests prior to arbitrating between them. For example only, minimum limits may be imposed to ensure reliable combustion, while maximum limits may be applied to prevent excessive torque or component damage. Information regarding whether each torque request was limited is transmitted to the arbitration feedback module 410.

The propulsion torque arbitration module 306 receives the torque requests from the axle torque arbitration module 304.

The propulsion torque arbitration module 306 also receives M torque requests from requestor modules 412-1, 412-2, . . . and 412-M. For example only, the requestor modules 412 may include engine overspeed protection, idle speed control, engine cranking and stopping control, and stall prevention.

The propulsion torque arbitration module 306 applies limits to the incoming torque requests and chooses between the incoming torque requests. The propulsion torque arbitration module 306 outputs a predicted torque request and an immediate torque request. These requests are used by the actuation mode module 314 to control the engine 102 to produce the requested predicted and immediate torque values.

The propulsion torque arbitration module 306 outputs information regarding any limits applied to the torque requests, as well as which requestors prevailed in torque arbitration, to the arbitration feedback module 410. The arbitration feedback module 410 provides feedback signals to each of the requestor modules 402 and 412.

The feedback signals may indicate to each of the requestor modules 402 and 412 whether the module prevailed in torque arbitration. In various implementations, the arbitration feedback module 410 may also specify what type of torque request prevailed over the torque request of the module when the torque request lost arbitration. The feedback signals may also specify whether the torque request was limited, whether the limit applied was an upper limit or a lower limit, and what the source of the limitation was.

In addition, the feedback signals may include information about engine capacities and capabilities. In various implementations, this feedback information may be determined based upon information from the torque estimation module 324 of FIG. 2. Engine capacities may include the maximum and minimum engine torque that can be produced, with stable combustion, at the current RPM and active fuel management (AFM) state. AFM may allow the cylinder actuator module 120 to selectively disable engine cylinders. AFM states may include, for example only, all cylinders active and half of the cylinders active.

Engine capabilities are the maximum and minimum engine torques that can be produced, with stable combustion, at specified RPMs for both AFM states. The specified RPMs are not limited to the current RPM. Engine capability information may be used to optimize the scheduling of torque requests. For example, in a strong hybrid configuration, the hybrid optimization module 308 may prepare the electric motor to take over torque production from the internal combustion engine as the internal combustion engine approaches a less fuel efficient operating range.

Figure 4:
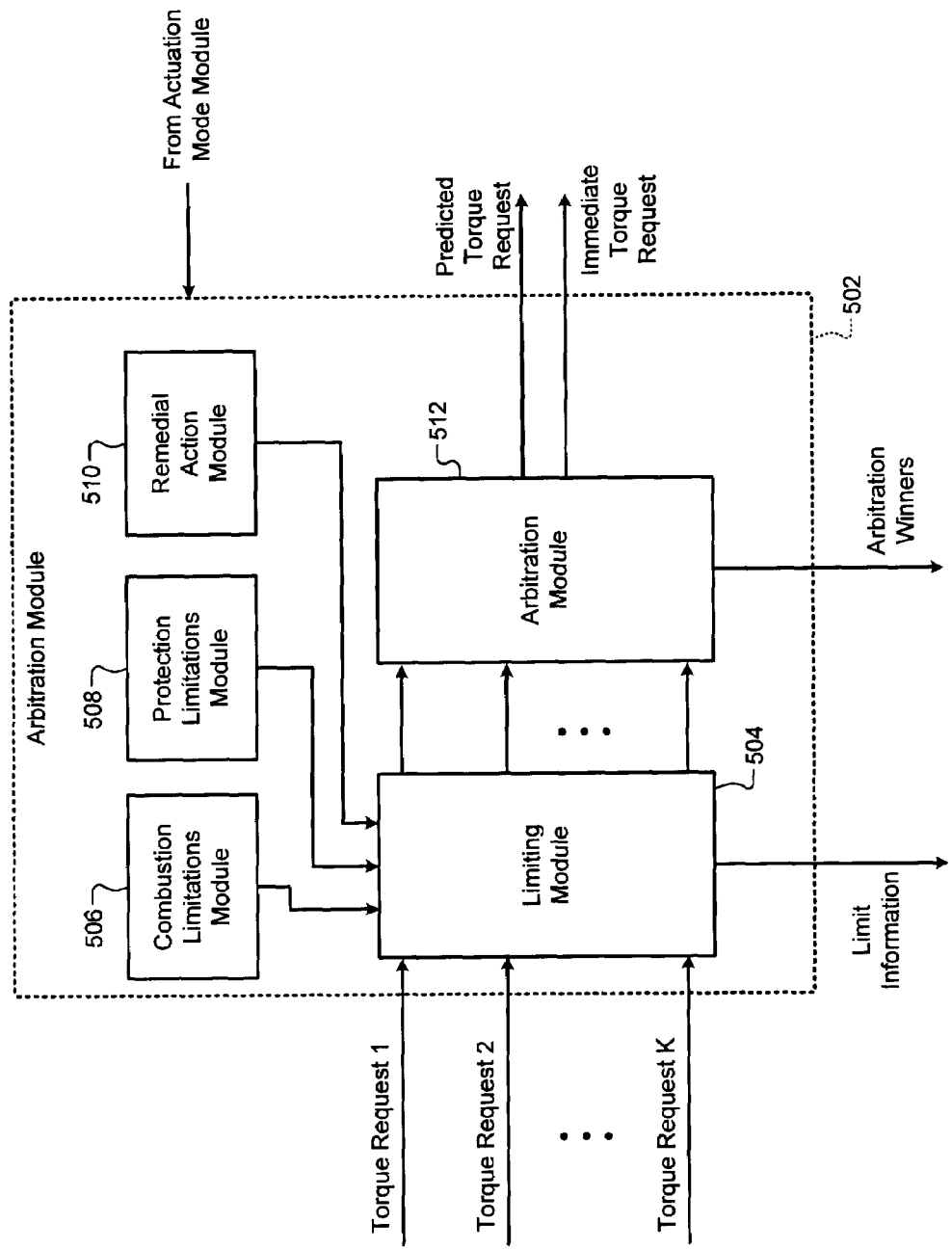
FIG. 4, a functional block diagram of an exemplary implementation of an arbitration module according to the principles of the present disclosure.

Referring now to FIG. 4, a functional block diagram of an exemplary implementation of an arbitration module 502 is presented. For example only, the axle torque arbitration module 304 and/or the propulsion torque arbitration module 306 may be implemented as shown in the arbitration module 502. The arbitration module 502 includes a limiting module 504.

The limiting module 504 receives K torque requests and applies upper and/or lower limits to the K torque requests. For example only, the K torque requests may include predicted and immediate torque requests. Different limits may apply to each type of torque request. For example only, immediate and predicted torque requests may correspond to respective upper and lower limits. In addition, predicted torque requests may have upper limits on the rate at which they can change.

A combustion limitations module 506 may provide upper and/or lower torque limits to ensure stable combustion to the limiting module 504. For example only, a lower limit may be applied to a predicted torque request based on the lowest amount of air flow that will still allow for stable combustion. The combustion limitations module 506 may provide a minimum limit for immediate torque requests that is based on the most that spark timing can be retarded by still achieving stable combustion.

A protection limitations module 508 may provide upper and/or lower torque limits for hardware protection to the limiting module 504. For example only, the protection limitations module 508 may provide an upper limit to predicted torque that minimizes fatigue on powertrain components due to excessive torque. For example only, the upper limit may be determined as a function of RPM.

A remedial action module 510 may supply upper and/or lower torque limits based on the availability of various actuators to the limiting module 504. The remedial action module 510 may take action in the event of a failure being detected. For example only, if throttle control is no longer reliable, the throttle may be returned to a high idle position, and limited to remain open below that position. This limitation of throttle position may provide an upper limit on predicted torque.

Alternatively, the remedial action module 510 may transmit (not shown) this torque limit to an arbitration module 512 as a torque request imposing an upper limit on torque. The arbitration module 512 arbitrates between incoming torque requests as limited by the limiting module 504. When the remedial action module 510 supplies an upper limit to the arbitration module 512, the arbitration module 512 may select that upper limit as the arbitration winner, assuming no other torque requests are lower.

The limiting module 504 supplies limit information to the arbitration feedback module 410 of FIG. 3. The limit information may specify which of the incoming torque requests were limited and by what type of limitation they were limited. For example, the limit information may specify whether the torque request was limited by an upper or a lower torque limit. The combustion limitations module 506, the protection limitations module 508, and the remedial action module 510 may receive feedback information from the actuation mode module 314 of FIG. 2 regarding engine capacities and capabilities and the state of various actuators.

The arbitration module 512 may arbitrate separately between predicted and immediate torque requests. Predicted torque requests may include maximum torque requests that impose an upper limit on torque and minimum torque requests that impose a lower limit on torque. The lowest maximum torque request and the highest minimum torque request are determined. The lower of these two values is selected as the winner of predicted torque arbitration. The source of this selected torque request is reported to the arbitration feedback module 410.

Immediate torque requests may include maximum torque requests that impose an upper limit on torque. Arbitration of immediate torque requests may therefore choose the lowest maximum torque request. The source of the winner of the immediate torque request arbitration is also reported to the arbitration feedback module 410. The arbitration module 512 outputs the winners of the predicted torque arbitration and immediate torque arbitration as the predicted torque request and the immediate torque request, respectively.

Figure 5:
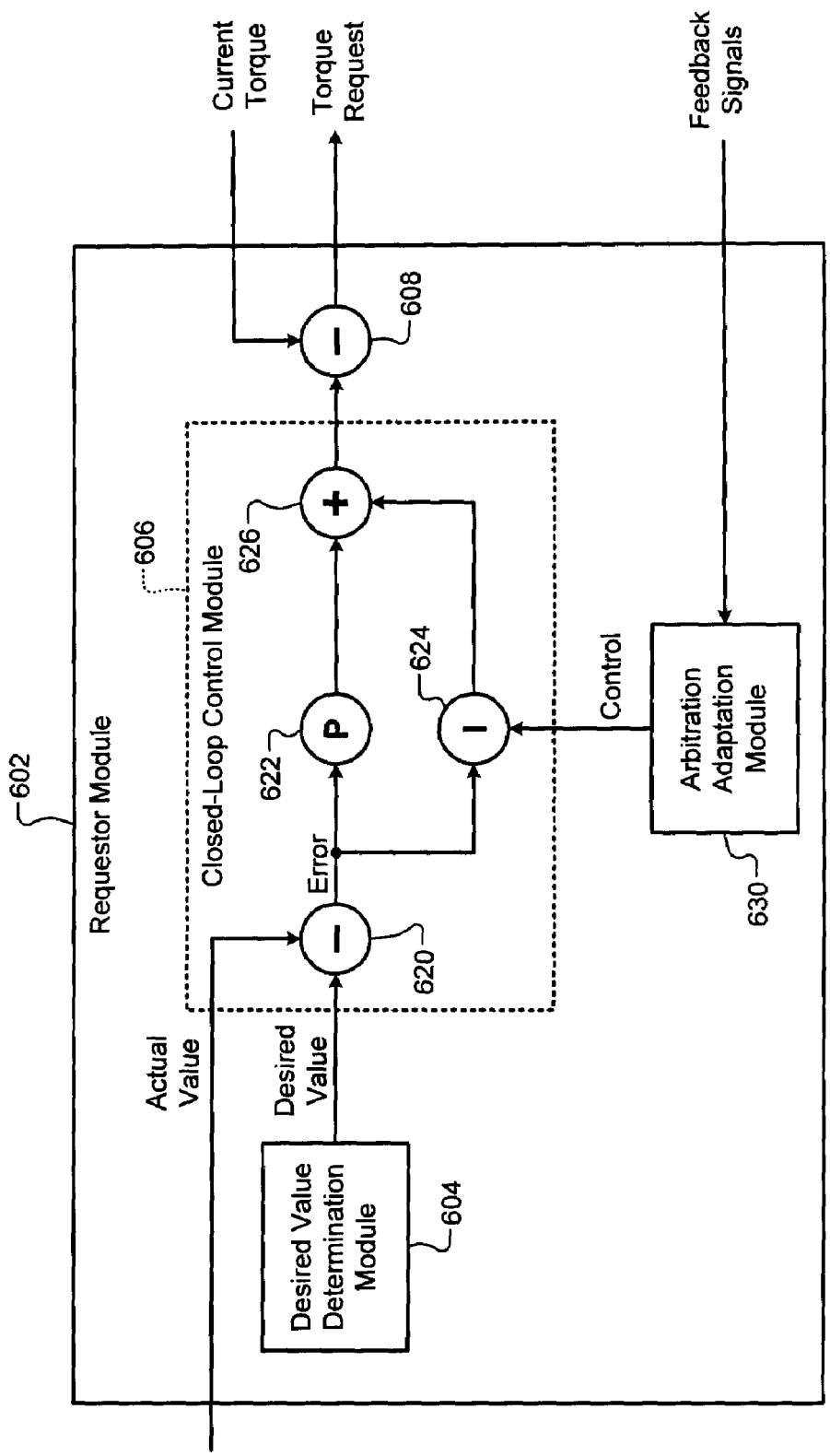
FIG. 5, a functional block diagram of an exemplary implementation of a requestor module according to the principles of the present disclosure.

Referring now to FIG. 5, a functional block diagram of an exemplary implementation of a requestor module 602 is presented. For example only, the requestor modules 402 and 412 of FIG. 3 may be implemented similarly to the requestor module 602. The requestor module 602 includes a desired value determination module 604. The desired value determination module 604 determines a desired value, which is output to a closed-loop control module 606. For example only, the desired value may be a vehicle speed when the requestor module 602 is a vehicle overspeed protection module.

The closed-loop control 606 receives the actual vehicle speed and produces a torque offset to bring the vehicle back to the desired top speed. The torque offset may be subtracted from the current vehicle torque by a subtraction module 608. The resulting torque request is output from the requestor module 602. The current vehicle torque may be the estimated torque from the torque estimation module 324. Because the desired value in this example is an upper limit on engine speed, the torque request from the requestor module 602 may be characterized as a maximum torque request.

When a maximum torque request wins arbitration, it decreases the amount of torque being produced. Maximum torque requests may therefore be referred to as decreasing torque requests. Similarly, lower limits on torque can be called increasing torque requests. Vehicle overspeed protection may therefore be termed a decreasing torque request.

In another example, the desired value may be a cruise control speed. The desired value determination module 604 may therefore output the current desired speed according to the cruise control system. In various implementations, the cruise control may be adaptive. The closed-loop control module 606 receives the actual value of the vehicle speed and outputs a torque offset to achieve the desired speed. In this case, the torque offset may be negative or positive depending on whether the vehicle speed is above or below the desired speed. The torque request output from the subtraction module 608 is therefore a bi-directional torque request, which may either increase or decrease engine torque.

The closed-loop control module 606 may include proportional-integral control. For example, the closed-loop control module 606 may include a subtraction module 620 that subtracts the desired value from the actual value, or vice versa. The difference is output as an error signal to a proportional module 622 and an integral module 624.

Outputs from the proportional module 622 and the integral module 624 are summed by a summing module 626 and output to the subtraction module 608. The proportional module 622 may multiply the error by a proportional constant. The integral module 624 may integrate, over time, the error multiplied by an integral constant. Operation of the integral module 624 may be controlled by an arbitration feedback module 630. The arbitration adaptation module 630 receives feedback results, such as from the arbitration feedback module 410 of FIG. 3.

For example only, the requestor module 602 may operate as a vehicle overspeed protection module. The desired value is therefore the vehicle's maximum speed. If the actual vehicle speed increases above the desired maximum speed, an error signal is produced by the subtraction module 620. This error is multiplied by a constant by the proportional module 622 and integrated by the integration module 624. The sum of these outputs is transmitted to the subtraction module 608.

As the error increases, the offset being output to the subtraction module 608 increases. This offset is subtracted from the current torque by the subtraction module 608 to produce the torque request. This torque request imposes an upper limit on torque produced by the engine. It is therefore known as a decreasing torque request.

If this decreasing torque request loses torque arbitration, torque arbitration rules imply that the arbitration winner was an even more severe decreasing request. If the error between the actual speed and the desired speed continues to be positive, the integrator module 624 should continue to integrate in an upward direction. Eventually, the torque request from the requestor module 602 will win arbitration and decrease the speed of the vehicle.

However, if the actual vehicle speed decreases below the desired top speed, the integrator module 624 may be instructed to hold steady instead of integrating in a downward direction. This control of the integrator module 624 may be performed by the arbitration adaptation module 630. The arbitration adaptation module 630 prevents downward integration because the winning arbitration request may be temporarily reducing the vehicle speed below the maximum speed. Once the winning torque request is removed, the vehicle speed may return to the previous overspeed condition.

The integrator 624 may therefore be prevented from integrating downward while the torque request from the requestor module loses in arbitration to another decreasing torque request. Integration may be prevented in the upward and/or downward direction, and may result in improved control once the torque request returns to prevailing in torque arbitration.

Referring now to FIG. 6, a table of exemplary integration control is presented. Column 702 is the requesting type of the torque request. For example only, decreasing torque requests may include engine overspeed protection and vehicle overspeed protection. For example only, increasing torque requests may include drag control and transmission downshift control. For example only, bi-directional torque requests may include cruise control and idle speed control.

Column 704 indicates whether the torque request won arbitration or lost arbitration and to which type of torque request arbitration was lost. Column 706 indicates whether the torque request is limited by a maximum limit, limited by a minimum limit, or not limited. Column 708 indicates whether integration is allowed in an upward direction for these parameters, while column 710 indicates whether integration is allowed downward for these parameters. An X in the column means that integration in that direction is allowed. Columns 708 and 710 include not applicable (N/A) for scenarios that do not occur. For example, a decreasing torque request will not hit a maximum limit, while an increasing torque request will not hit a minimum limit.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
   a first torque request module that generates a first torque request;
   a second torque request module that generates a second torque request;
   a torque arbitration module that selects one of the first and second torque requests and outputs an arbitrated torque based on the selected one of the first and second torque requests;
   an arbitration feedback module that reports a status signal to the first torque request module, wherein the status signal has a first value when the first torque request is the selected one of the first and second torque requests; and
   a torque control module that controls a power source to produce the arbitrated torque.

2. The engine control system of claim 1 wherein the arbitration feedback module reports a second status signal to the second torque request module, wherein the second status signal has the first value when the second torque request is the selected one of the first and second torque requests.

3. The engine control system of claim 1 wherein the first torque request module includes a closed-loop control module that generates a torque offset based on an error signal and wherein the first torque request module generates the first torque request based on the torque offset.

4. The engine control system of claim 3 wherein the first torque request module generates the first torque request based on the torque offset and a current torque value, wherein the current torque value is an estimate of torque currently produced by the engine, and wherein the error signal is based on a difference between an actual vehicle parameter and a desired vehicle parameter.

5. The engine control system of claim 3 wherein the closed-loop control module includes an integrator that integrates the error signal, wherein operation of the integrator is controlled based on the status signal.

6. The engine control system of claim 5 wherein the integrator is prevented from integrating in at least one of a first direction and a second direction based on the status signal.

7. The engine control system of claim 5 wherein the torque arbitration module selectively applies a limit to the first torque request and selectively applies the limit to the second torque request, wherein the arbitrated torque is based on the limited first and second torque requests.

8. The engine control system of claim 7 wherein the arbitration feedback module reports a limit signal to the first torque request module, wherein the limit signal has a first value when the limit is applied to the first torque request.

9. The engine control system of claim 8 wherein operation of the integrator is controlled based on the status signal and the limit signal.

10. The engine control system of claim 1 wherein the power source includes an internal combustion engine.

11. A method comprising:
generating a first torque request;
generating a second torque request;
selecting one of the first and second torque requests;
generating an arbitrated torque based on the selected one of the first and second torque requests;
reporting a status signal, wherein the status signal has a first value when the first torque request is the selected one of the first and second torque requests; and
controlling a power source to produce the arbitrated torque.

12. The method of claim 11 further comprising reporting a second status signal, wherein the second status signal has the first value when the second torque request is the selected one of the first and second torque requests.

13. The method of claim 11 further comprising:
performing closed-loop control that generates a torque offset based on an error signal; and
generating the first torque request based on the torque offset.

14. The method of claim 13 further comprising generating the first torque request based on the torque offset and a current torque value, wherein the current torque value is an estimate of torque currently produced by the engine, and wherein the error signal is based on a difference between an actual vehicle parameter and a desired vehicle parameter.

15. The method of claim 13 further comprising:
integrating the error signal; and
controlling the integrating based on the status signal.

16. The method of claim 15 further comprising suspending the integrating in at least one of a first direction and a second direction based on the status signal.

17. The method of claim 15 further comprising:
selectively applying a limit to the first torque request;
selectively applying a limit to the second torque request; and
generating the arbitrated torque based on the limited first and second torque requests.

18. The method of claim 17 further comprising reporting a limit signal, wherein the limit signal has a first value when the limit is applied to the first torque request.

19. The method of claim 18 further comprising controlling the integrating based on the status signal and the limit signal.

20. The method of claim 11 wherein the power source includes an internal combustion engine.

* * * * *